(12) United States Patent
Burke, III et al.

(10) Patent No.: US 6,599,615 B2
(45) Date of Patent: Jul. 29, 2003

(54) CUSHIONED RUBBER FLOOR ARTICLE FOR USE IN HAIR STYLING SALONS AND OTHER SERVICE ENVIRONMENTS

(75) Inventors: William O. Burke, III, LaGrange, GA (US); Amy B. Streeton, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 27 days.

(21) Appl. No.: 10/002,734

(22) Filed: Nov. 15, 2001

(65) Prior Publication Data

US 2003/0091782 A1 May 15, 2003

(51) Int. Cl.$^7$ .................................................. B32B 3/26
(52) U.S. Cl. ................. 428/192; 428/314.4; 428/318.6; 428/318.8; 428/319.3; 428/319.9; 428/120; 428/157
(58) Field of Search ................................ 428/120, 119, 428/308.4, 314.4, 318.8, 318.6, 319.3, 319.9, 157, 192; 52/177

(56) References Cited

U.S. PATENT DOCUMENTS

| | | | |
|---|---|---|---|
| 1,805,038 A | 5/1931 | Derr | |
| 6,296,733 B1 | 10/2001 | Hudkins et al. | 156/245 |
| 6,340,514 B1 | 1/2002 | Kerr et al. | 428/159 |
| 6,420,015 B1 | 7/2002 | Nord et al. | 428/172 |

*Primary Examiner*—Alexander S. Thomas
(74) *Attorney, Agent, or Firm*—Terry T. Moyer; Charlotte C. Wilson

(57) ABSTRACT

The present invention is a floor mat made from a rubber composite, the composite having a foam rubber core positioned between dense rubber layers. Protrusions or cleats, which are produced during the vulcanization process, extend outwardly from the lower surface of the mat. The present mat offers mat users desirable anti-fatigue characteristics that are achieved by (a) a combination of dense rubber and foam rubber layers and (b) the spaced positioning of a plurality of cleats over one surface of the mat. Such a mat is anticipated to be useful in service environments, such as hair styling salons, retail outlets, or restaurant kitchens, for example.

14 Claims, 3 Drawing Sheets

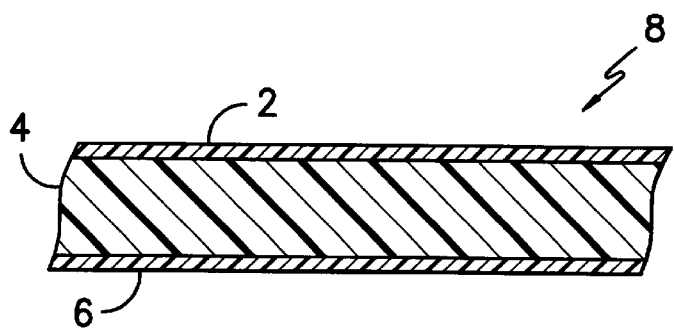
FIG. -1-
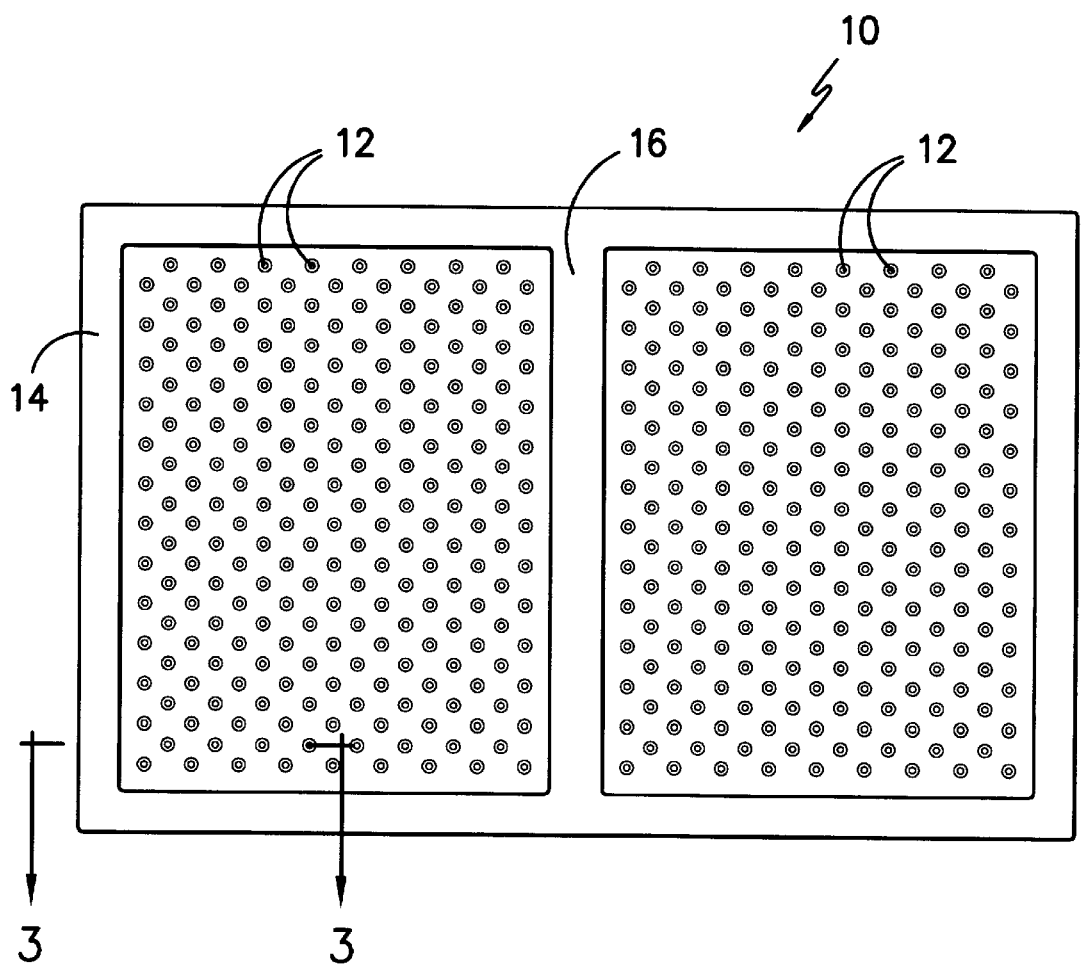
FIG. -2-

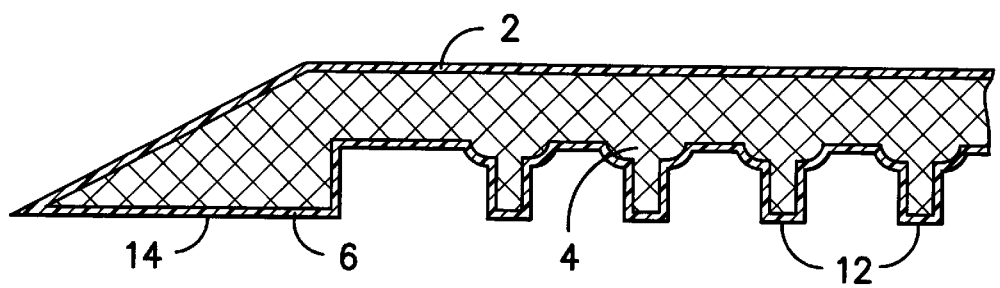
FIG. -3A-
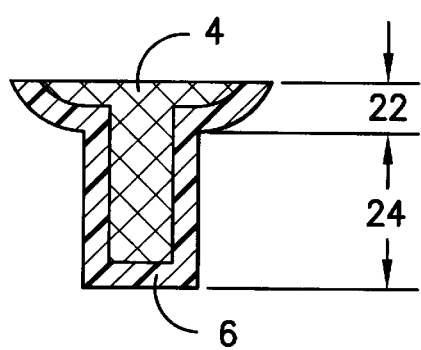
FIG. -3B-
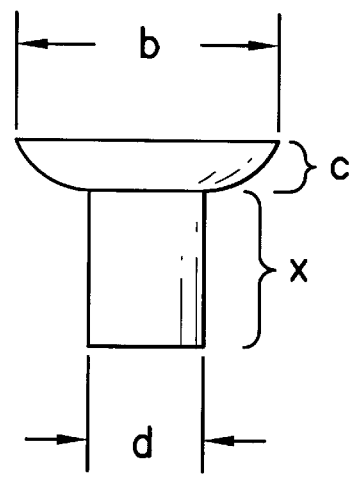
FIG. -3C-

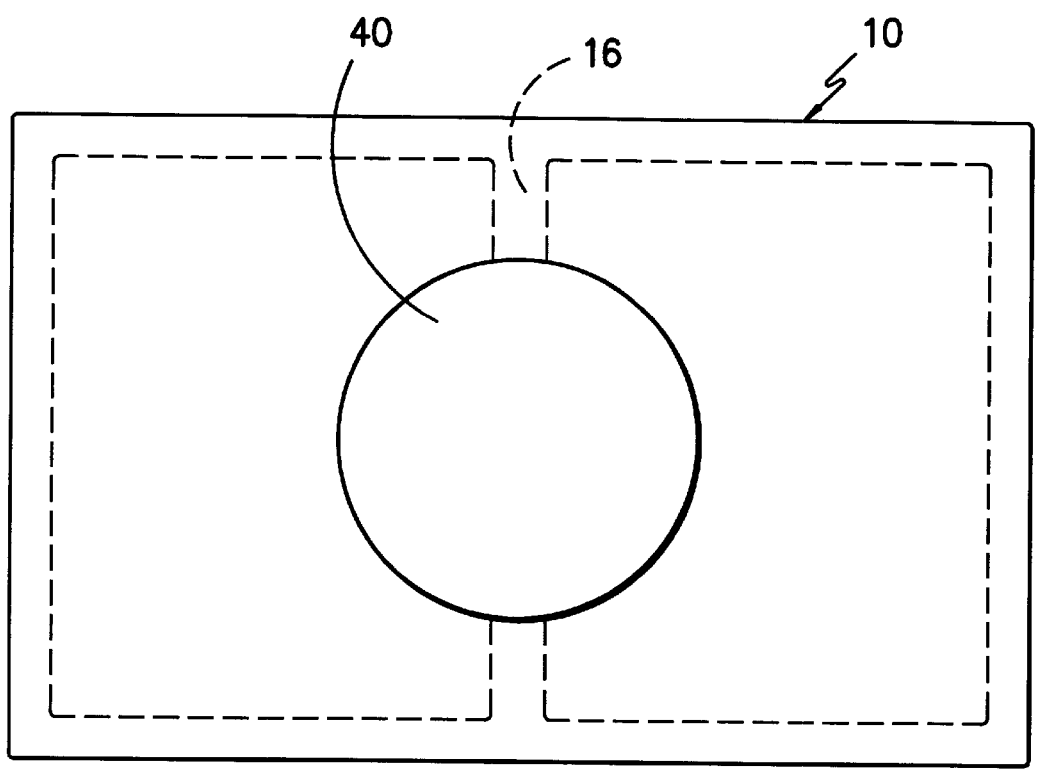
FIG. -4-

CUSHIONED RUBBER FLOOR ARTICLE FOR USE IN HAIR STYLING SALONS AND OTHER SERVICE ENVIRONMENTS

TECHNICAL FIELD

Generally, the present disclosure relates to a rubber floor mat. Specifically, the present disclosure relates to a rubber floor mat that provides a high level of comfort to the users thereof, even during extended periods of standing. Moreover, the surfaces of the mat exhibit resistance to chemicals, stains, and scuffing. Additionally, these mats have little tendency to absorb water during use. Such mats are suitable for use in a variety of applications where the mats' anti-fatigue and other physical properties are desirable. The present mat is particularly well suited for use by hair stylists, beauticians, and barbers, although use by other service professionals will be described herein.

BACKGROUND

For some time now, employers have struggled with how to better protect employees from the rigors of standing in a relatively stationary position for long periods. People who stand for long periods may develop Cumulative Standing Trauma (CST) because of excessive stress on the back, legs, and other various muscles. CST can lead to varicose veins and to arch and heel pain from flattened feet. Such problems can result in increased absenteeism and health care costs for the employer and lower job satisfaction for the employee.

Seeking to minimize the fatigue and discomfort felt by workers standing on concrete or other hard flooring surfaces, employers have used a variety of mats and other flooring articles in an attempt to cushion the work surface where employees stand. To this end, several types of mats or flooring articles have been used to combat CST and to cushion the work surfaces of stationary employees. These range from traditional carpeting to mats made from vinyl, rubber, or tufted substrates. When considering service industries, such as hair salons, restaurants, and retail outlets, for example, the problems associated with the previous alternatives become clear.

First, traditional carpet has many drawbacks when used in service industries. In hair styling salons, for example, carpet would tend to collect cut hair, resulting in cleaning difficulties and an undesirable appearance. Furthermore, traditional carpet is not capable of withstanding the chemical environment present in a styling salon. Bleach, hair-setting chemicals, and the like tend to damage both the aesthetic and physical characteristics of the carpet. In a restaurant kitchen, for example, tufted carpeting is susceptible to stains from dropped food items. Users of tufted mats experience similar problems with maintaining the desired appearance of the mats.

Another approach consists of a vinyl mat, which has an upper surface made from smooth vinyl and a backing surface made of foam rubber. Vinyl mats used in service environments are deficient for a number of reasons. First, they have little ability to provide necessary anti-fatigue characteristics. Second, the vinyl surface of such mats is substantially smooth, making it likely to be slippery when wet. In a hair styling salon, this can be dangerous to both salon employees and customers. Another and significant problem of such vinyl mats is that they are incapable of withstanding industrial laundering, because the foam layers of such mats typically disintegrate with repeated washings.

Rubber mats, comprised of only dense or solid rubber, have also been used. These rubber mats are more durable than vinyl, but they do not provide much underfoot support to users. Such a rubber mat is described in U.S. Pat. No. 4,377,016 to Niermeijer. Solid rubber mats typically are susceptible to cracking caused from industrial laundering. Many of these dense rubber mats have bristle-like projections rising from the surface thereof, which are capable of dislodging dirt from pedestrians' footwear. Such bristles tend to break with use and are not capable of providing any significant underfoot comfort to those crossing or standing on the mat.

The present mat overcomes the shortcomings of previous attempts, especially when used in service environments, such as hair styling salons, retail outlets, or restaurant kitchens, for example. The present mat offers mat users desirable anti-fatigue characteristics that are achieved by (a) a combination of dense rubber and foam rubber layers and (b) the spaced positioning of a plurality of cleats over one surface of the mat. The resultant mat provides a useful alternative to mats of the prior art.

SUMMARY

The present invention is a floor mat made from a rubber composite, the composite having a foam rubber core positioned between dense rubber layers. Protrusions or cleats, which are produced during the vulcanization process, extend outwardly from the rear surface of the mat. These cleats, and the rubber composite used to create them, provide a desirable cushioning effect to users of the mat who may be required to stand in a relatively stationary position for long periods. Furthermore, the present mat resists chemical degradation and staining. Such a mat is anticipated to be useful to hair stylists and barbers, as well as other service professionals.

BRIEF DESCRIPTION OF THE DRAWINGS

FIG. 1 is a cross-sectional view of the layers of dense and foam rubber used in the manufacture of the mat of the present invention;

FIG. 2 is a plan view of the cleated surface of the mat of the present disclosure;

FIG. 3A is a cross-sectional view of the mat of FIG. 2, as taken along line 3—3;

FIG. 3B is a cross-sectional view of one of the cleats shown in FIG. 2;

FIG. 3C is a schematic representation of the cleat of FIG. 3B, showing the relative dimensions of various portions of the cleat; and FIG. 4 is a plan view showing the positioning of a chair pedestal on the mat of FIG. 2.

DETAILED DESCRIPTION

The term "upper" surface refers to that portion of the mat that is seen under normal use conditions. The term "lower" surface refers to the surface of the mat that is normally in contact with the floor (that is, the back of the mat).

The term "cleat" is intended to encompass any type of protrusion from the rubber mat sheet that is formed during the vulcanization process and is, therefore, an integrated portion of the mat. Thus, such a cleat would be produced by allowing molten rubber to flow or move through a die mold during vulcanization into a position in which it remains until it cures and sets. The protrusion or cleat may be of any size. As will be further described herein, the separate cleats or protrusions provide discrete areas of relaxed stress within the present mat (particularly since their core is of foam rubber). The result is a cushioning effect that is greater than that of an overall flat foam rubber structure.

FIG. 1 shows a cross-sectional view of a rubber composite 8 having several integrated layers (2, 4, and 6) used to create the mat of the present disclosure. The present mat (10) encompasses a floor mat structure comprising at least three separate layers of rubber, wherein the three layers include:

a substantially flat first layer 2 comprised of dense rubber;
a second layer 4 comprised of blowable foam rubber; and
a third layer 6 comprised of dense rubber.

A plurality of downwardly projecting protrusions (referred to herein as cleats) is integrated within the rubber mat structure. These protrusions are shown as cleats 12 in FIGS. 2 and 3A.

FIG. 2 shows a plurality of cleats 12 that are positioned in spaced relation on the back (or lower) surface of mat 10. Cleats 12 are positioned in the interior space of mat 10 as defined by border 14 that frames the perimeter of mat 10. Border 14 is tapered from the interior portion of mat 10 to the outer periphery edges. Most preferably, the width of border 14 is about three inches. It has been found that this width is most effective in preventing slippage of mat 10 on the floor and preventing mat users from tripping over its edges. As shown, mat 10 further includes a reinforcing strip 16, which may be desirable in some applications. Reinforcing strip 16 provides additional stability to the structure of mat 10; however, reinforcing strip 16 is not required to have a functional, durable article.

FIG. 3A is a cross-section of mat 10, as taken along line 3—3 of FIG. 2. Border 14 is shown as having approximately the same height as cleats 12. Dense rubber layer 2 is positioned at the upper surface of mat 10, while rubber layers 4 and 6 create cleats (or protrusions) 12 during vulcanization. Foam rubber layer 4 expands during vulcanization, due to the presence of a blowing agent, to produce the closed-cell structure that contributes to mat 10's cushioning characteristics.

FIG. 3B is a cross-sectional view of cleat 12. Cleat 12 is integral to the structure of mat 10 and has a hemispherical lower tier 22 and a cylindrical upper tier 24. Foam rubber layer 4 is shown as the core of cleat 12 with dense rubber layer 6 providing a "cap" over the core; portion. In a preferred embodiment, the height of cylindrical tier 24 is greater than that of hemispherical tier 22.

A schematic representation of the dimensions of hemispherical tier 22 and cylindrical tier 24 is shown in FIG. 3C. The width of hemispherical tier 22 is indicated by b, while the height of hemispherical tier 22 is shown as c. Cylindrical tier 24 has a width shown as d and a height indicated as x. The height of cylindrical tier 24 is represented by a variable (x), because such height is dependent upon process conditions, such as temperature and pressure. The width d of cylindrical tier 24 should preferably be smaller than the width b of hemispherical tier 22.

If the b and d measurements are equal to one another, a cylindrical cleat is produced. However, in the present mat, b should preferably in the range of about 0.375 inches to about 0.500 inches, and d should be preferably in the range of about 0.102 inches to about 0.155 inches. The height c of hemispherical tier 22 is preferably in the range of about 0.140 inches to about 0.213 inches. In a more preferred embodiment, b is about 0.375 inches, c is about 0.183 inches, and d is about 0.141 inches. Given these more preferred dimensions, the ratio of d to b is about 2.66.

FIG. 4 shows the relative position of a barber's chair pedestal 40 on mat 10. Ideally, chair pedestal 40 is positioned in a central portion of mat 10 and, preferably, over or along reinforcing strip 16. Positioning pedestal 40 in this area allows the barber or stylist to remain on a cushioned work surface while moving freely around the customer.

Turning again to the FIGURES, the first and third layers 2, 6 of composite 8 (as shown in FIG. 1) comprise a dense rubber composition. Such a dense rubber may be comprised of any standard type of rubber, such as acrylonitrile-butadiene (NBR), styrene-butadiene (SBR), carboxylated NBR, carboxylated SBR, and blends thereof, all merely as examples. Preferably, dense rubber layers 2, 6 are comprised of NBR. The desired thickness for first and third layers 2, 6 is from about 2 to about 50 mils, preferably from about 4 to about 40mils, and more preferably from about 5 to about 35 mils, and most preferably from about 5 to about 25 mils.

The second (core) layer 4 of rubber may be comprised of any standard rubber composition, including, but not limited to, acrylonitrile-butadiene rubber (NBR), styrene-butadiene rubber (SBR), carboxylated derivatives of such butadienes, chlorinated rubber, silicon-containing rubber, and the like, all of which must include a blowing agent to form the necessary closed-cell structure of the resultant foam rubber. These are described in U.S. Pat. No. 5,305,565 to Nagahama et al. The preferred rubbers are NBR, SBR, and blends thereof.

One preferred rubber formulation is a proprietary compound sold under the name HM-8 from Hoover Hanes Custom Rubber Mixing Corporation, a subsidiary of RBX of Roanoke, Va. It contains from 20 parts to 70 parts by weight carbon black particles in each layer, which enhance the static dissipating qualities of mat 10.

Dense rubber layers 2, 6 are preferably placed on either side of foam rubber core layer 4 as to cover the entire layer before vulcanization. In a preferred embodiment, dense rubber layers 2, 6 are calendered to both sides of foam rubber layer 4 before vulcanization. One benefit of foam rubber 4 is that it permits the retention and return to the original shape of mat 10. Overall, mat 10 provides an article that will retain its aesthetically pleasing characteristics over a long time, thereby translating into reduced costs for the consumer.

More importantly, foam rubber layer 4 provides yet another benefit in its ability to cushion the users' feet during extended periods of standing. In fact, people standing in a relatively stationary position for long periods may develop Cumulative Standing Trauma (CST). CST is the result of excessive stress on the back, legs, and other muscles. CST can lead to varicose veins, as well as arch and heel pain from flattened feet. Mat 10 combats these problems by providing a cushioned surface on which users may stand. Mat 10 is relatively easy to compress, unlike solid rubber or vinyl-topped mats that are more rigid. In addition, mat 10 is capable of recovering more than 90% of its original height, even after being compressed for 24 hours.

To provide the desired cushioning ability, foam rubber layer 4 is used as the core layer of mat 10 and the core of the integrated rubber protrusions or cleats 12 (see FIGS. 3A and 3B). Foam rubber layer 4 is generally present in a thicker layer than dense rubber layers 2, 6 that cover it. The desired thickness of core layer 4 is from about 5 to about 500 mils, preferably from about 25 to about 400 mils, more preferably from about 40 to about 250 mils, and most preferably from about 75 to about 200 mils.

When layered composite 8 is prepared and cut to a desired length, a die mold is positioned on top of the cut composite. During vulcanization, molten rubber flows through the openings in the mold to create tiered cleats 12. The high pressures (about 15 psi to about 50 psi, preferably about 20 psi to about 40 psi) and temperatures (about 250° F. to about 400° F., preferably from about 320° F. to about 340° F.) associated with vulcanization soften rubber composite 8 and force a certain amount of layers 4, 6 through the die mold openings. Dense rubber layer 6 does not permit the less dense blown foam rubber 4 to protrude through dense rubber layer 6 during vulcanization. Hence, the resultant cleats 12 possess foam rubber cores and dense rubber caps. Despite being displaced onto the cleat tops, dense rubber layer 6 still remains intact and maintains sufficient strength to preserve the integrity of mat 10. Regarding the die mold, it may be constructed of any material that can withstand the vulcanization temperatures and pressures described above. Thus, the die may be constructed of virtually any metal, such as aluminum, titanium, steel, and the like; certain plastics, such as Teflon®; silicon; and the like. Preferably, the die mold is made of aluminum, is generally square or rectangular (although any shape may be utilized), and includes holes or openings throughout to ultimately form the desired protrusions. Preferably, such holes are circular in shape. However, the holes are not cylindrical in shape (that is, the circular shape is not continuous from one surface of the die to the other). In a particularly preferred embodiment, each area of the die that will produce a cleat has a domed structure with a small circular opening at the peak portion of the dome. During vulcanization, the molten rubber flows into the domed area and through the small opening of the die, creating a cleat whose upper portion is cylindrical and whose lower portion is hemispherical (see FIG. 3B).

A significant problem within the field of rubber mats concerns the deterioration of the dense rubber backing sheet due to the exposure of the mats to an oxidizing environment during use and cleaning. Specifically, the oxidizing agents to which the mat is exposed during laundering tend to cleave the carbon-carbon double bonds in the dense rubber layer, thus making the rubber brittle and susceptible to cracking under the stress of normal use. In addition to the laundering process, the exposure of the mats to oxygen and ozone, either atmospheric or generated, during storage and use leads to cracking over time.

The mat of the present invention may therefore include an ozone-resistance additive, such as ethylene-propylene-diene monomer rubber (EPDM), which provides enhanced protection to the rubber backing sheet against oxygen in order to substantially prolong the useful life of the mat. The use of this additive is taught in U.S. Pat. No. 5,906,662, to Kerr, which is hereby incorporated by reference. As discussed in U.S. Pat. No. 6,150,576 to Rockwell, Jr. (also incorporated herein by reference), such an additive also appears to reduce the tendency of the mats to stain surfaces that they contact, such as concrete, wood, or even a handler's skin, just to name a few.

Rubber mats, in general, have exhibited general problems arising from frequent washings and harsh environments of use. First, the energy required to wash and dry a typical floor mat is significant due to the overall mass of the mats. The overall mass is most significantly attributed to the mass of rubber within the mat. Foam rubber component 4 is important in reducing the weight of mat 10. As will be appreciated, a reduction in the overall mass of floor mat 10 will result in a reduced energy requirement in washing and drying mat 10.

The lighter weight of the mat structure reduces the possibility of mat 10 harming either the washing or drying machine into which mat 10 is placed for cleaning and also reduces the possibility of mat 10 itself being damaged during such rigorous procedures. Although mat 10 is capable of withstanding the rigors of industrial machine washing, hand washing and any other manner of cleaning may also be utilized. Specifically, mat 10 may be easily swept, mopped, vacuumed, hosed off, or even pressure washed. In a hair styling environment, for example, mat 10 may be routinely swept during normal work hours with hosing or mopping occurring at the end of the day. In an environment such as a restaurant kitchen, hosing may be the preferred method of routine cleaning. When mat 10 is used by cashiers in a retail outlet, regular sweeping may provide sufficient cleaning.

When used in a hair styling salon or barber shop, mat 10 must satisfy many technical requirements. Primarily, as has been mentioned, mat 10 offers underfoot cushioning to salon professionals, thereby minimizing their fatigue and discomfort. The upper surface of mat 10 also provides a non-skid, water-resistant surface for salon workers and their customers. Further, the surface of mat 10 is resistant to damage caused by bleach or hair setting chemicals. An unexpected benefit of mat 10 is that its cushioning ability is generally sufficient to prevent dropped items, such as shears or clippers, from breaking. A barber's shears can be quite expensive and are susceptible to damage when dropped onto a hard floor.

Mat 10 may be used in any environment in which persons are standing for long periods. These include, by way of example only, restaurant kitchens, cashier stations in grocery or other stores, school classrooms, manufacturing locations, and the like. For these reasons, and those described herein, it is believed that mat 10 represents a useful advancement over the prior art.

We claim:

1. A mat, capable of providing anti-fatigue properties to users thereof, said mat comprising:
   (a) an upper surface comprised of dense rubber, said upper surface being substantially smooth and integrally connected to
   (b) a core layer comprised of closed-cell foam rubber, said foam rubber being integrally connected to
   (c) a lower surface comprised of dense rubber;
   wherein a plurality of integrated protrusions extend downwardly from said lower surface, said protrusions having
      a tiered structure,
      a first tier being substantially hemispherical and projecting from said lower surface and a second tier being substantially cylindrical and projecting from said first tier.

2. The anti-fatigue mat of claim 1 wherein said upper and lower surfaces are selected from the group consisting of acrylonitrile-butadiene (NBR), styrene-butadiene (SBR), carboxylated NBR, carboxylated SBR, and ethylene-propylene-diene monomer rubber (EPDM).

3. The anti-fatigue mat of claim 2 wherein said upper and lower surfaces are comprised of acrylonitrile-butadiene (NBR).

4. The anti-fatigue mat of claim 1 wherein said core layer is selected from the group consisting of acrylonitrile-butadiene (NBR), styrene-butadiene (SBR), carboxylated NBR, carboxylated SBR, chlorinated rubber, silicon-containing rubber, ethylene-propylene-diene monomer rubber (EPDM), and blends thereof, all of which include a blowing agent.

5. The anti-fatigye mat of claim 4 wherein said core layer comprises acrylonitrile-butadiene (NBR).

6. The anti-fatigue mat of claim 4 wherein said core layer comprises styrene-butadiene (SBR).

7. The anti-fatigue mat of claim 4 wherein said core layer comprises acrylonitrile-butadiene (NBR) and styrene-butadiene (SBR).

8. The anti-fatigue mat of claim 1 wherein said mat further comprises a reinforcing strip positioned laterally across said mat, said reinforcing strip being positioned approximately in a central area of said mat.

9. The anti-fatigue mat of claim 1 wherein said mat has a border, said border being integral to said mat and framing a perimeter around said mat.

10. The anti-fatigue mat of claim 9 wherein the height of said border tapers from an interior portion of said mat to an exterior edge portion of said mat.

11. The anti-fatigue mat of claim 9 wherein said border has a width of approximately three inches.

12. The anti-fatigue mat of claim 1 wherein said mat is used in a hair styling establishment.

13. The anti-fatigue mat of claim 1 wherein said mat is used in a restaurant kitchen.

14. The anti-fatigue mat of claim 1 wherein said mat is used in a cashier station in a grocery or other retail store.

* * * * *

UNITED STATES PATENT AND TRADEMARK OFFICE
CERTIFICATE OF CORRECTION

PATENT NO. : 6,599,615 B2
DATED : July 29, 2003
INVENTOR(S) : William O. Burke III and Amy B. Streeton It is certified that error appears in the above-identified patent and that said Letters Patent is hereby corrected as shown below:

Column 6,
Line 61, after the word "The" delete "anti-fatigye" and insert -- anti-fatigue --.

Signed and Sealed this

Sixth Day of September, 2005

JON W. DUDAS
*Director of the United States Patent and Trademark Office*